(12) United States Patent
Kim et al.

(10) Patent No.: US 10,712,606 B2
(45) Date of Patent: Jul. 14, 2020

(54) COLOR CONVERSION PANEL AND DISPLAY DEVICE INCLUDING THE SAME

(71) Applicant: SAMSUNG DISPLAY CO., LTD., Yongin-si, Gyeonggi-do (KR)

(72) Inventors: Jang-Il Kim, Asan-si (KR); Keun Woo Park, Incheon (KR); Hoon Kang, Suwon-si (KR); Tae Jin Kong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 68 days.

(21) Appl. No.: 15/855,729

(22) Filed: Dec. 27, 2017

(65) Prior Publication Data
US 2018/0180935 A1 Jun. 28, 2018

(30) Foreign Application Priority Data
Dec. 27, 2016 (KR) .................. 10-2016-0180298

(51) Int. Cl.
*G02F 1/1335* (2006.01)
*G02F 1/13357* (2006.01)

(52) U.S. Cl.
CPC .. *G02F 1/133514* (2013.01); *G02F 1/133512* (2013.01); *G02F 1/133617* (2013.01); *G02F 2201/50* (2013.01); *G02F 2201/501* (2013.01); *G02F 2202/36* (2013.01)

(58) Field of Classification Search
CPC ... G02F 1/133514; G02F 2001/136222; G02F 2201/52; G02F 1/133512; G02F 1/136209; G02F 2201/501; G02F 2202/36; G09G 3/2003; G09G 2300/0452; G09G 2300/0443; G09G 3/3607; G09G 3/3611; G09G 5/02; G02B 5/201; H01L 27/322; H01L 27/3213; H01L 27/3218; H01L 27/3211
See application file for complete search history.

(56) References Cited

U.S. PATENT DOCUMENTS

| 2013/0242228 A1* | 9/2013 | Park | G02F 1/133617 349/61 |
| 2013/0335799 A1* | 12/2013 | Yoon | G02B 26/02 359/227 |
| 2014/0240617 A1* | 8/2014 | Fukutome | G02F 1/13338 349/12 |
| 2014/0312339 A1* | 10/2014 | Fujita | H01L 27/322 257/40 |

(Continued)

FOREIGN PATENT DOCUMENTS

| KR | 10-1110072 B1 | 1/2012 |
| KR | 10-2013-0104862 A | 9/2013 |

(Continued)

*Primary Examiner* — Jia X Pan
(74) *Attorney, Agent, or Firm* — Innovation Counsel LLP

(57) ABSTRACT

An exemplary embodiment of present disclosure provides a color conversion panel including: a substrate; a plurality of light blocking layers disposed on the substrate; a color conversion layer disposed on the substrate between the plurality of the light blocking layers and including quantum dots; an optical filter layer covering the color conversion layer and the light blocking layers; and a hydrogen blocking layer disposed on one surface of the optical filter layer.

13 Claims, 7 Drawing Sheets

(56) References Cited

U.S. PATENT DOCUMENTS

| | | | |
|---|---|---|---|
| 2015/0171269 A1* | 6/2015 | Kim | H01L 33/005 |
| | | | 257/13 |
| 2015/0187878 A1* | 7/2015 | Yamazaki | H01L 27/1225 |
| | | | 257/43 |
| 2015/0333229 A1* | 11/2015 | Seo | H01L 51/504 |
| | | | 257/89 |
| 2016/0299387 A1* | 10/2016 | Yamazaki | H01L 27/3232 |
| 2016/0340553 A1 | 11/2016 | Eckert et al. | |
| 2017/0059928 A1* | 3/2017 | Kim | G02F 1/133514 |
| 2017/0082892 A1* | 3/2017 | Chung | G02F 1/133514 |
| 2017/0153368 A1* | 6/2017 | Yoon | G02F 1/133512 |
| 2017/0242292 A1* | 8/2017 | Jeon | G02F 1/133509 |
| 2018/0163926 A1* | 6/2018 | Fujiki | B29C 70/16 |
| 2018/0182839 A1* | 6/2018 | Lee | H01L 51/0097 |

FOREIGN PATENT DOCUMENTS

| | | |
|---|---|---|
| KR | 10-2015-0033155 A | 4/2015 |
| KR | 10-2016-0099650 A | 8/2016 |
| KR | 10-2017-0062595 A | 6/2017 |
| WO | WO2015-095296 A1 | 6/2015 |

\* cited by examiner

COLOR CONVERSION PANEL AND DISPLAY DEVICE INCLUDING THE SAME

CROSS-REFERENCE TO RELATED APPLICATION

This application claims priority to and the benefit of Korean Patent Application No. 10-2016-0180298 filed in the Korean Intellectual Property Office on Dec. 27, 2016, the entire contents of which are incorporated herein by reference.

BACKGROUND

(a) Field

The present disclosure relates to a color conversion panel and a display device including the same.

(b) Description of the Related Art

Field generating electrodes of a liquid crystal display used as a display device are disposed on one of two display panels. A plurality of thin film transistors and pixel electrodes are disposed in a matrix form on one display panel (hereinafter referred to as a thin film transistor array panel), and red, green, and blue color filters are disposed on the other display panel (hereinafter referred to as a common electrode panel), while a common electrode covers an entire surface thereof.

A deposition process (which is one of processes for manufacturing the display device) is a process in which a deposition source is evaporated in a hydrogen atmosphere to be deposited on a deposition target. In the process in which the deposition source is deposited on the deposition target, hydrogen gas present in a deposition chamber and hydrogen gas deposited on a surface of the deposition target may be congregated. The congregated hydrogen gas may be released to the outside during subsequent manufacturing processes to penetrate into other constituent elements of the display device, thereby causing defects.

The above information disclosed in this Background section is only for enhancement of understanding of the background of the inventive concept and therefore it may contain information that does not form the prior art that is already known in this country to a person of ordinary skill in the art.

SUMMARY

The present disclosure has been made in an effort to provide a color conversion panel and a display device including the same.

An exemplary embodiment of the present disclosure provides a color conversion panel including: a substrate; a plurality of light blocking layers disposed on the substrate; a color conversion layer disposed on the substrate between the plurality of light blocking layers and including quantum dots; an optical filter layer covering the color conversion layer and the light blocking layers; and a hydrogen blocking layer disposed on one surface of the optical filter layer.

The hydrogen blocking layer may be made of a light transmissive material.

The hydrogen blocking layer may be made of a transparent conductive material or a transparent polymer resin.

The hydrogen blocking layer may be disposed between the optical filter layer and the color conversion layer.

The hydrogen blocking layer may be disposed on one surface of the optical filter layer corresponding to an opposite side of the color conversion layer.

The optical filter layer may include a plurality of layers in which inorganic layers having different refractive indexes are alternately stacked.

The optical filter layer may include: a first inorganic material layer including a silicon nitride; and a second inorganic material layer including a silicon oxide. The first inorganic material layer may contact the color conversion layer and the light blocking layers.

The color conversion panel may further include a capping layer disposed the optical filter layer and the color conversion layer.

The hydrogen blocking layer may be disposed between the capping layer and the color conversion layer.

The hydrogen blocking layer may be disposed between the capping layer and the optical filter layer.

The capping layer may include an inorganic material containing nitrogen.

Another embodiment of the present disclosure provides a display device including: a display panel including a plurality of pixels; and a color conversion panel disposed at one surface of the display panel, wherein the color conversion panel may include: a substrate; a plurality of light blocking layers disposed on the substrate; a color conversion layer a disposed on the substrate between the plurality of the light blocking layers, overlapping the plurality of the pixels, and including quantum dots; an optical filter layer covering the color conversion layer and the light blocking layers; and a hydrogen blocking layer disposed on one surface of the optical filter layer.

The hydrogen blocking layer may be made of a light transmissive material.

The hydrogen blocking layer may be made of a transparent conductive material or a high-density transparent polymer resin.

The transparent conductive material may be ITO or IZO.

The hydrogen blocking layer may be disposed between the color conversion layer and the optical filter layer.

The display device may further include a capping layer disposed between the optical filter layer and the color conversion layer.

The capping layer may be disposed between the hydrogen blocking layer and the optical filter layer.

The capping layer may be disposed between the hydrogen blocking layer and the color conversion layer.

The hydrogen blocking layer may be disposed on an opposite side of the color conversion layer with respect to the optical filter.

According to the embodiment of the present disclosure, it is possible to prevent hydrogen gas collected in a manufacturing process of a color conversion panel from penetrating into a liquid crystal layer during a subsequent high temperature process.

DETAILED DESCRIPTION OF THE EMBODIMENTS

Figure 1:
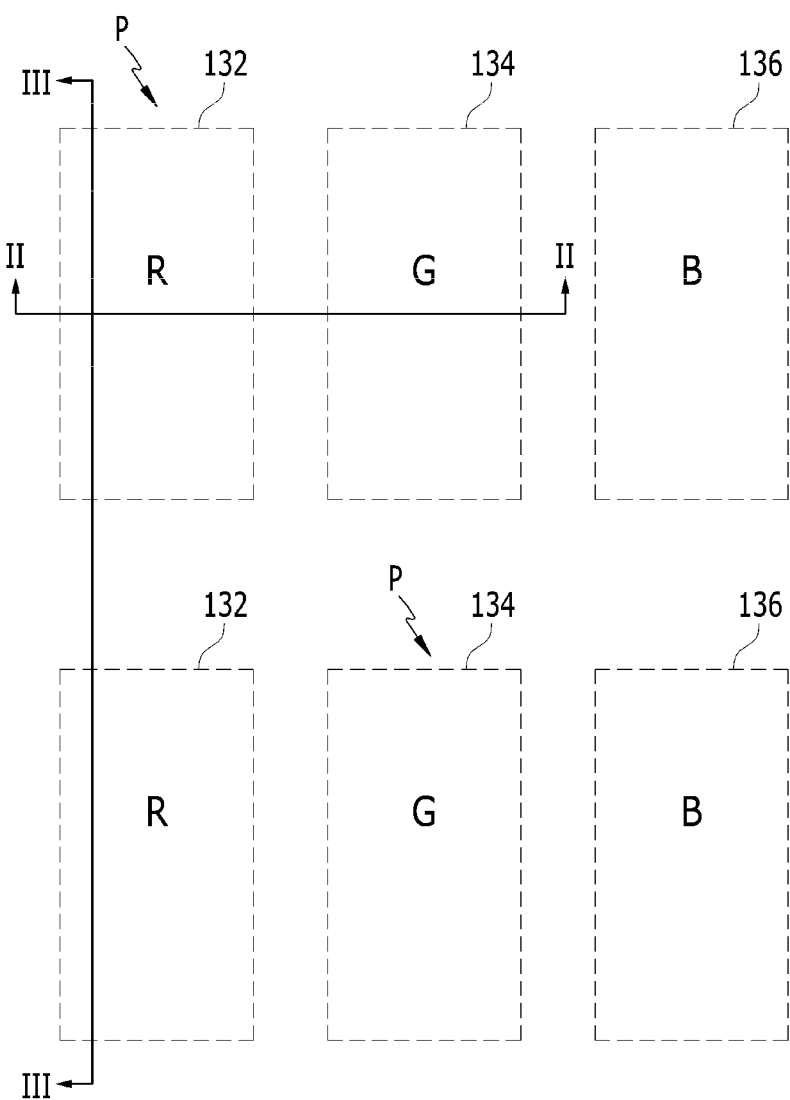
FIG. 1 illustrates a top plan view of a color conversion panel according to an exemplary embodiment of the present disclosure.

Exemplary embodiments of the present disclosure will now be described in detail with reference to the accompanying drawings. In describing the present disclosure, a description of known functions or configurations will be omitted so as to make the subject matter of the present disclosure more clear.

To clearly describe the present disclosure, portions which do not relate to the description are omitted, and like reference numerals designate like elements throughout the specification. The size and thickness of each component shown in the drawings are arbitrarily shown for better understanding and ease of description, but the present disclosure is not limited thereto.

In the drawings, the thickness of layers, films, panels, regions, etc., are exaggerated for clarity. For better understanding and ease of description, the thickness of some layers and areas is exaggerated. It will be understood that when an element such as a layer, film, region, or substrate is referred to as being "on" another element, it can be directly on the other element or intervening elements may also be present.

In FIG. 1 to FIG. 7, color conversion panels 100 according to an exemplary embodiment and exemplary modified embodiments of the present disclosure are shown. A color conversion panel 100 according to an exemplary embodiment of the present disclosure will be described with reference to FIG. 1 to FIG. 3.

Figure 2:
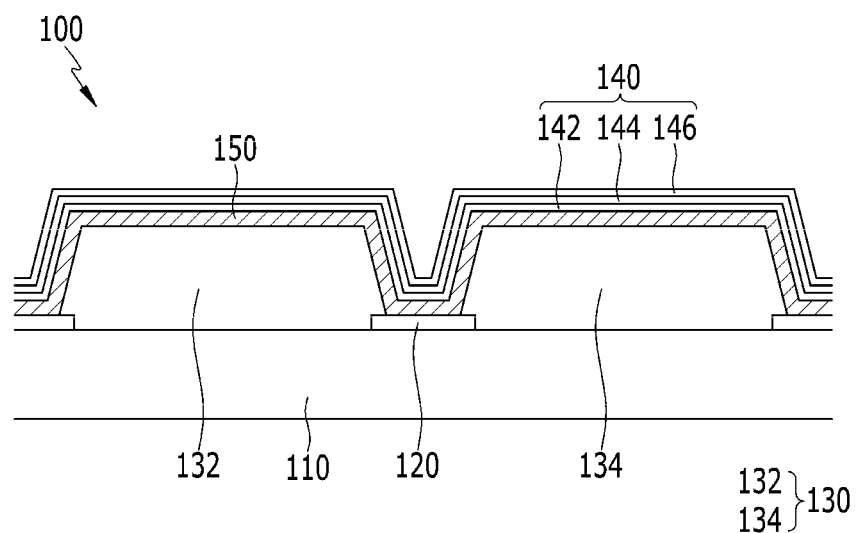
FIG. 2 illustrates a cross-sectional view taken alone line II-II of FIG. 1.
Figure 3:
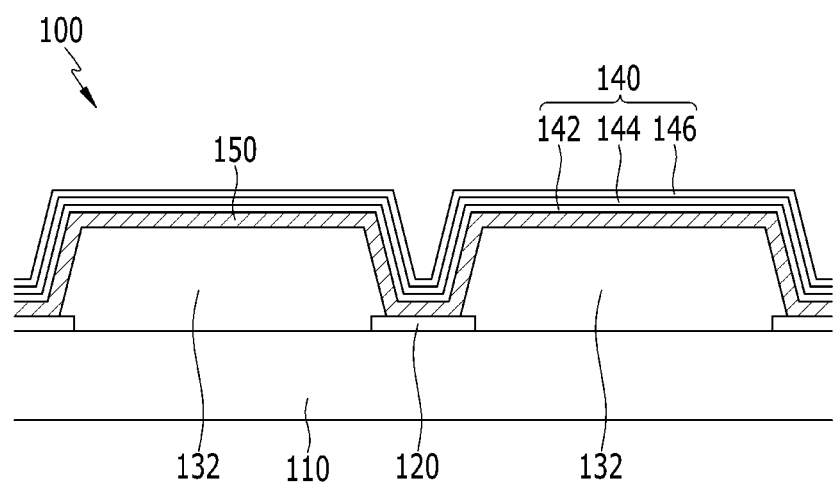
FIG. 3 illustrates a cross-sectional view taken along line of FIG. 1.

FIG. 1 illustrates a top plan view of the color conversion panel 100 according to the present exemplary embodiment, FIG. 2 illustrates a cross-sectional view taken alone line II-II of FIG. 1, and FIG. 3 illustrates a cross-sectional view taken along line of FIG. 1. As shown in FIG. 2 and FIG. 3, the color conversion panel 100 according to the present exemplary embodiment includes a plurality of light blocking layers 120 disposed on a non-display area of a substrate 110.

The light blocking layers 120 may be formed of a metal, an organic layer or an organic layer with a transflective layer surrounding the organic layer.

Conversion layer 130 is disposed on display areas of the substrate 110. The conversion layer 130 may be disposed on the display areas which are not covered by light blocking layers 120. The conversion layer 130 may include a first color conversion layer 132 and a second color conversion layer 134. An edge of the first color conversion layer 132 and an edge of the second color conversion layer 134 may overlap the light blocking layers 120. A transmissive layer 136 may be disposed on display areas of the substrate 110 on which the first color conversion layer 132 and the second color conversion layer 134 are not disposed. Only one first color conversion layer 132, one second color conversion layer 134, and one transmissive layer 136 are shown in FIG. 1, however, in the color conversion panel 100 according to the present exemplary embodiment, the first color conversion layers 132, the second color conversion layers 134, and the transmissive layers 136 may be repeatedly arranged in vertical and horizontal directions.

In this case, a conversion layer 130 including the first color conversion layer 132 and the second color conversion layer 134, and the transmissive layer 136 according to the present exemplary embodiment, may be formed in an island form. In FIG. 1, a cutting line II-II and a cutting line are shown. Since the conversion layer 130 including the first color conversion layer 132 and the second color conversion layer 134, and the transmissive layer 136 of the present exemplary embodiment are formed in the island form, when they are cut along the cutting line II-II, they have the same cross-section as in FIG. 2, and when they are cut along the cutting line they have the same cross-section as in FIG. 3. Only the cross-section formed by cutting the first color conversion layer 132 in shown in FIG. 3, but when the second conversion layer 134 or the transmissive layer 136 is cut to be parallel to the cutting line it may have the same cross-section as or similar to that of FIG. 3. The color conversion layer 130 having an island shape will be described in detail and a display device 1000 (refer to FIG. 8) will be described later.

The light blocking layers 120 may be disposed between the transmissive layer 136 and the first color conversion layer 132 and between the transmissive layer 136 and the second color conversion layer 134.

As such, the light blocking layers 120 may define a region in which the first color conversion layer 132, the second color conversion layer 134, and the transmissive layer 136 that are adjacent to each other are disposed. The first color conversion layer 132 includes a plurality of red quantum dots, and the second color conversion layer 134 includes a plurality of green quantum dots. Predetermined light incident on the first color conversion layer 132 may be converted into red light by the red quantum dots, and the red light may be emitted from the first color conversion layer 132, and predetermined light incident on the second color conversion layer 134 may be converted into green light by the green quantum dots, and the green light may be emitted from the second color conversion layer 134.

Although not shown, a blue blocking filter may be disposed between the first color conversion layer 132 and the substrate 110 and between the second color conversion layer 134 and the substrate 110. The blue blocking filter (not shown) may block or absorb blue light emitted from a light assembly described later.

In the present exemplary embodiment, the first and second color conversion layers 132 and 134 and the transmissive layer 136 may include a photosensitive resin.

In the present exemplary embodiment, the quantum dot may be selected from a group II-VI compound, a group III-V compound, a group IV-VI compound, a group IV element, a group IV compound, and a combination thereof.

The II-VI group compound may be selected from a two-element compound selected from CdSe, CdTe, ZnS, ZnSe, ZnTe, ZnO, HgS, HgSe, HgTe, MgSe, MgS, and a mixture thereof; a three-element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The III-V group compound may be selected from a two-element compound selected from GaN, GaP, GaAs, GaSb, AlN, AlP, AlAs, AlSb, InN, InP, InAs, InSb, and a mixture thereof; a three-element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a four-element compound selected from GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and a mixture thereof. The IV-VI group compound may be selected from a two-element compound selected from SnS, SnSe, SnTe, PbS, PbSe, PbTe, and a mixture thereof; a three-element compound selected from SnSeS, SnSeTe, SnSTe, PbSeS, PbSeTe, PbSTe, SnPbS, SnPbSe, SnPbTe, and a mixture thereof; and a four-element compound selected from SnPbSSe, SnPbSeTe, SnPbSTe, and a mixture thereof. The Group IV element may be selected from Si, Ge, and a mixture thereof. The Group IV compound may be a two-element compound selected from SiC, SiGe, and a mixture thereof.

In this case, the two-element compound, the three-element compound, or the four-element compound may exist in particles at a uniform concentration, or in the same particle while being divided to have partially different concentration distributions. Alternatively, they may have a core/shell structure where one quantum dot encloses another quantum dot. An interface between the core and the shell may have a concentration gradient, such that a concentration of an element existing in the shell gradually decreases closer to a center of the interface.

The quantum dot may have a full width at half maximum (FWHM) of the light-emitting wavelength spectrum that is equal to or less than about 45 nm, preferably equal to or less than about 40 nm, and more preferably equal to or less than about 30 nm, and in this range, color purity or color reproducibility may be improved. In addition, since light emitted through the quantum dot is emitted in all directions, a viewing angle of light may be improved.

In addition, the quantum dot is not specifically limited to have shapes that are generally used in the technical field related to the present disclosure, and more specifically, may have a shape such as a nano-particle having a spherical shape, a pyramid shape, a multi-arm shape, or a cubic shape, or may be a nanotube, a nanowire, a nanofiber, a planar nano-particle, etc.

The transmissive layer 136 may pass predetermined light incident thereon. The blue light may be transmitted through the transmissive layer 136. The transmissive layer 136 may be made of a polymer material which transmits blue light emitted from a light source (not shown). That is, the transmissive layer 136 corresponding to a blue pixel passes the incident blue light as it is without changing a wavelength. The transmissive layer 136 may include a plurality of scatterers (not shown). The scatterers scatter light incident on the transmissive layer 136, thereby increasing an amount of light emitted from the transmissive layer 136 or t making front luminance and side luminance uniform. Although not shown, in order to scatter incident light, at least one of the first color conversion layer 132 and the second color conversion layer 134 may further include the scatterers described in the transmissive layer 136.

For example, the scatterer may include at least one of $TiO_2$, $Al_2O_3$, and $SiO_2$, but is not limited thereto.

The transmissive layer 136 may include a blue pigment. The above-described scatterers reflect external light and reduce a contrast ratio, and for solving this problem, the blue pigment may be added to the transmissive layer 136. The blue pigment may absorb at least one of red light and green light included in the external light.

As described above, since the color conversion panel according to the present exemplary embodiment includes a quantum dot having a self-emissive characteristic and a narrow emissive spectrum, it is possible to realize a wide viewing angle and high color reproducibility.

An optical filter layer 140 is disposed on the first color conversion layer 132, the second color conversion layer 134, the transmissive layer 136, and the light blocking layers 120.

The optical filter layer 140 may include a plurality of layers, and the plurality of layers may have a structure in which at least two layers with different refractive indexes are alternately arranged in a direction substantially perpendicular to the substrate 110. For example, the optical filter layer 140 may have a structure in which a silicon oxide ($SiO_x$) layer and a silicon nitride ($SiN_y$) layer are alternately arranged. In addition, titanium oxide, tantalum oxide, hafnium oxide, zirconium oxide, or the like may be used as an exemplary material having a relatively high refractive index, and $SiCO_z$ or the like may be used as an exemplary material having a relatively low refractive index. In the chemical formula above, x, y, and z of $SiO_x$, $SiN_y$, and $SiCO_z$ are factors that determine a chemical composition ratio, and they may be adjusted according to process conditions for forming the layers.

A number of the optical filter layers 140 in which layers with different refractive indexes are alternately arranged may be about 10 to 20. However, the present disclosure is not limited thereto, and the number of the layers may be irrelevant when it is possible to improve light efficiency by reflecting light generated from the first and second color conversion layers 132 and 134. In the drawings, the triple-layered optical filter layer 140 is shown for convenience of understanding and illustration.

The optical filter layer 140 may reflect or absorb light of a predetermined wavelength. The optical filter layer 140 may transmit/reflect the light of the predetermined wavelength by using constructive interference/destructive interference between an inorganic layer having a high refractive index and an inorganic layer having a low refractive index. The optical filter layer 140 may transmit light of a wavelength to be emitted among light of a light source and absorb light of a wavelength not to be emitted. The optical filter layer 140 may reflect light traveling toward the color conversion layer 130 to the outside.

The optical filter layer 140 may include at least one of $TiO_2$, $SiN_x$, $SiO_x$, TiN, AlN, $Al_2O_3$, $SnO_2$, $WO_3$, and $ZrO_2$, and in this case, a material such as $TiO_x$, $TaO_x$, $HfO_x$, and $ZrO_x$ as an example of an inorganic layer having a high refractive index may be included, and a material such as $SiO_x$, and $SiCO_z$ as an example of an inorganic layer having a low refractive index may be used.

In the present exemplary embodiment, $SiN_x$ and $SiO_x$ may be alternatingly disposed in the optical filter layer 140. For example, a first inorganic material layer 142 and the third inorganic material 146 may be $SiN_x$ and a second inorganic material layer 144 may be $SiO_x$. Alternatively, the third inorganic material layer 146 may be made of a different material from the first inorganic material layer 142 and the second inorganic material layer 144.

When a capping layer 160 is not formed, the first inorganic material layer 142 among the plurality of optical filter layers 140 may include $SiN_x$ to replace the capping layer 160.

A hydrogen blocking layer 150 is disposed between the optical filter layer 140 and the color conversion layer 130. Although not shown, the hydrogen blocking layer 150 may be disposed between the optical filter layer 140 and the transmissive layer 136. When forming the optical filter layer 140, inorganic materials, for example, $SiN_x$ and $SiO_x$, may be deposited a plurality of times. The optical filter 140 may be formed in a hydrogen atmosphere in a deposition chamber, therefor, hydrogen atoms may be included in the optical filter. The hydrogen atoms may be congregated at an interface between the optical filter layer 140 and the color conversion layer 130. Thereafter, when a high temperature process is performed, the hydrogen gas congregated at the interface between the optical filter layer 140 and the color conversion layer 130 may diffuse into a display panel 200, for example, a liquid crystal layer 215, (refer to FIG. 8 and FIG. 10) disposed on one surface of the color conversion panel 100, thereby causing defects.

For preventing this problem, the hydrogen blocking layer 150 disposed on one surface of the optical filter layer 140 is included in the present exemplary embodiment. The hydrogen blocking layer 150 may prevent diffusion of hydrogen atoms therethrough. The one surface of the optical filter layer 140 corresponds to one of an upper surface and a lower surface of the optical filter layer 140. An exemplary embodiment in which the hydrogen blocking layer 150 is disposed between the optical filter layer 140 and the color conversion layer 130 is shown in FIG. 2. When the hydrogen blocking layer 150 is present at a position as shown in FIG. 2, it is possible to prevent the hydrogen gas from being congregated at the interface between the optical filter layer 140 and the color conversion layer 130.

The hydrogen blocking layer 150 according to the present exemplary embodiment may be made of a light transmissive material. In addition, it should be made of a material with a sufficient density to prevent the collecting of the hydrogen gas or to prevent the releasing of hydrogen gas in order to prevent the collecting or releasing of the hydrogen gas.

Therefore, the hydrogen blocking layer 150 according to the present exemplary embodiment may be made of a transparent conductive material such as ITO or IZO or a high-density transparent polymer resin which prevent hydrogen atoms from diffusing therethrough, but is not limited thereto. In addition, when the color conversion panel 100 is used in a flexible display device, a material included in the hydrogen blocking layer 150 may be selected depending on whether or not the color conversion panel 100 is flexible.

Figure 4:
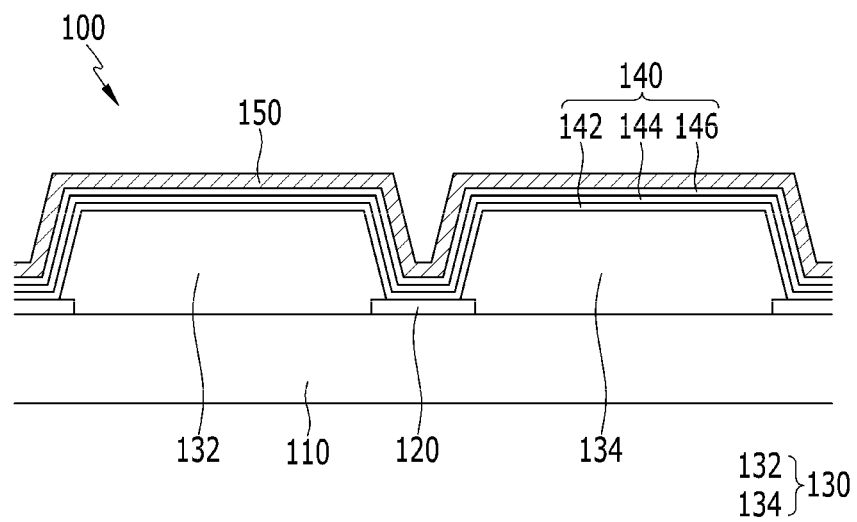
FIG. 4 illustrates a color conversion panel according to a first exemplary modified embodiment of FIG. 2.

FIG. 4 illustrates a color conversion panel 100 according to a first exemplary modified embodiment of FIG. 2. Referring to FIG. 4, the hydrogen blocking layer 150 may be disposed on one surface of the optical filter layer 140 corresponding to an opposite side of the color conversion layer 130 and the light blocking layers 120 with the optical filter layer 140 therebetween. In other words, in FIG. 4, the color conversion layer 130 including the first color conversion layer 132 and the second color conversion layer 134 and the light blocking layers 120 are disposed at a lower portion of the optical filter layer 140, and the hydrogen blocking layer 150 is disposed at an upper portion of the optical filter layer 140. As shown in FIG. 4, when the optical filter layer 140 is covered by the hydrogen blocking layer 150, it is possible to prevent the hydrogen gas congregated at the interface between the optical filter layer 140 and the color conversion layer 130 from being diffused into in the display panel 200 described later (refer to FIG. 8 and FIG. 10).

Figure 5:
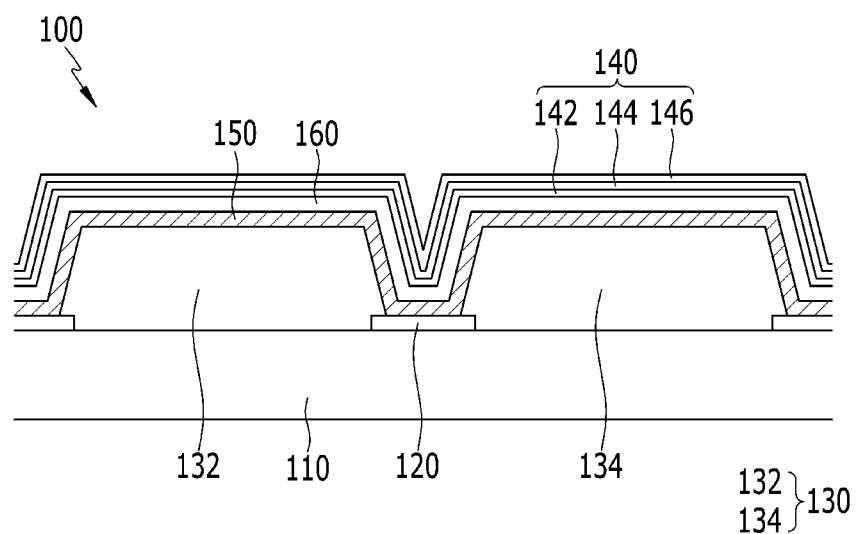
FIG. 5 illustrates a color conversion panel according to a second exemplary modified embodiment of FIG. 2.
Figure 6:
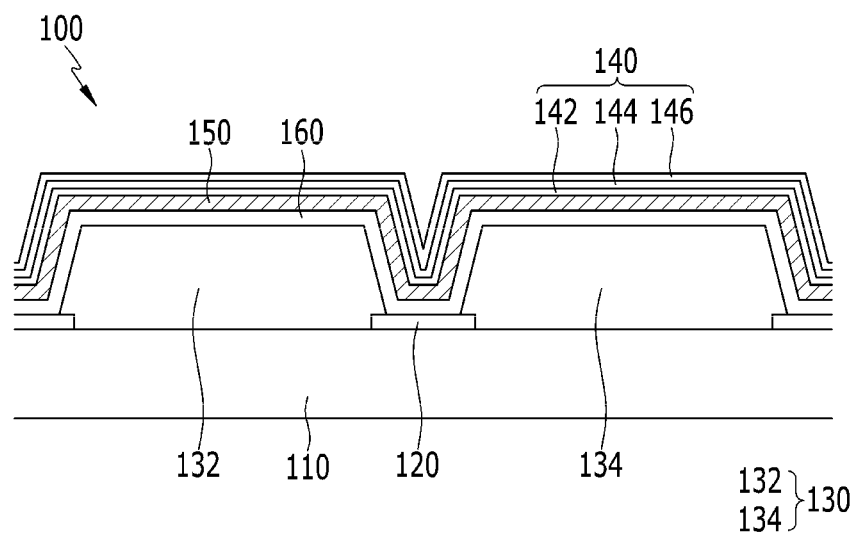
FIG. 6 illustrates a color conversion panel according to a third exemplary modified embodiment of FIG. 2.
Figure 7:
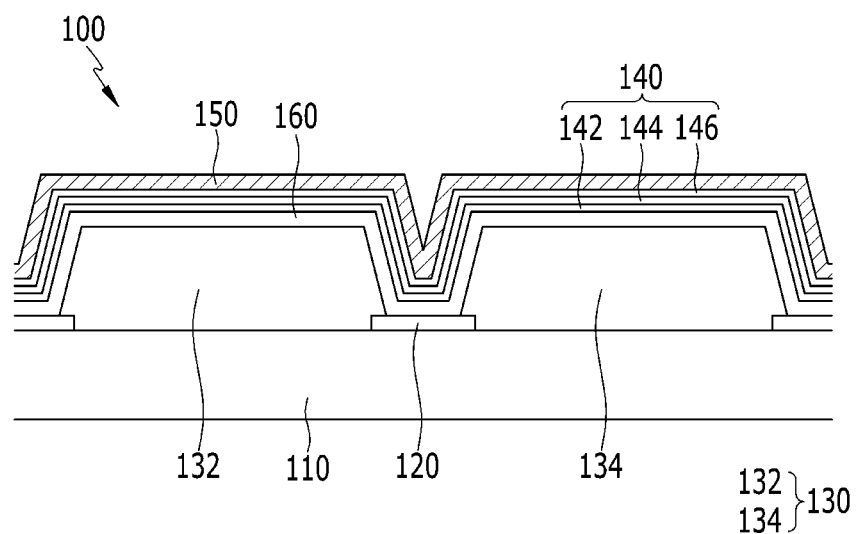
FIG. 7 illustrates a color conversion panel according to a fourth exemplary modified embodiment of FIG. 2.

In this case, a color conversion panel 100 may additionally include a capping layer 160 according to another exemplary modified embodiment of the present exemplary embodiment. FIG. 5 to FIG. 7 illustrate the color conversion panel 100 additionally including the capping layer 160, respectively. Hereinafter, the color conversion panel 100 additionally including the capping layer 160 will be described with reference to FIG. 5 to FIG. 7.

The capping layer 160 may be an inorganic material layer made of silicon nitride. Referring to FIG. 5, the capping layer 160 may be disposed between the optical filter layer 140 and the first color conversion layer 132, between the optical filter layer 140 and the second color conversion layer 134, between the optical filter layer 140 and the transmissive layer 136, and between the optical filter layer 140 and the light blocking layers 120. During high temperature processes after the first color conversion layer 132, the second color conversion layer 134, and the transmissive layer 136 are formed, the capping layer 160 may prevent the quantum dots of the first color conversion layer 132 and the second color conversion layer 134 from being broken or damaged due to moisture and the high temperature processes. However, when an inorganic layer disposed closest to the first color conversion layer 132, the second color conversion layer 134, the transmissive layer 136, and the light blocking layers 120 among inorganic layers included in the optical filter layer 140 is formed as a silicon nitride layer, the capping layer may be omitted, and an exemplary embodiment according to this structure is as described in FIG. 2.

FIG. 5 illustrates a color conversion panel 100 according to a second exemplary modified embodiment of FIG. 2, and referring to FIG. 5, the capping layer 160 is formed between the optical filter layer 140 and the hydrogen blocking layer 150 in the color conversion panel 100 of FIG. 2, thus it is possible to prevent hydrogen gas from being congregated at the interface between the capping layer 160 and the color conversion layer 130.

FIG. 6 illustrates a color conversion panel 100 according to a third exemplary modified embodiment of FIG. 2. Referring to FIG. 6, the hydrogen blocking layer 150 is disposed under the optical filter layer 140, and the capping layer 160 is disposed under the hydrogen blocking layer 150. According to the third exemplary modified embodiment shown in FIG. 6, the hydrogen blocking layer 150 is disposed between the capping layer 160 and the optical filter layer 140, thus it is possible to prevent the hydrogen gas congregated at the interface between the optical filter layer 140 and the capping layer 160 from being diffused into in the display panel 200 described later (refer to FIG. 8 and FIG. 10).

FIG. 7 illustrates a color conversion panel 100 according to a fourth exemplary modified embodiment of FIG. 2. Referring to FIG. 7, the optical filter layer 140 is disposed on the capping layer 160, and the hydrogen blocking layer 150 is disposed on the optical filter layer 140. According to the fourth exemplary modified embodiment shown FIG. 7, as in FIG. 6, it is possible to prevent the hydrogen gas congregated at the interface between the optical filter layer 140 and the capping layer 160 from being diffused into in the display panel 200 described later (refer to FIG. 8 and FIG. 10).

The color conversion panel 100 according to the exemplary embodiment of the present disclosure and the various exemplary modified embodiments thereof have been described above. According to the present exemplary embodiments and the exemplary modified embodiments, it is possible to prevent the hydrogen gas congregated in the interface between layers from diffusing into the display panel 200 (refer to FIG. 8 and FIG. 10), even though the hydrogen gas is released during the subsequent high temperature process. Hereinafter, a display device 1000 (refer to FIG. 8) according to another exemplary embodiment of the present disclosure will be described.

Figure 8:
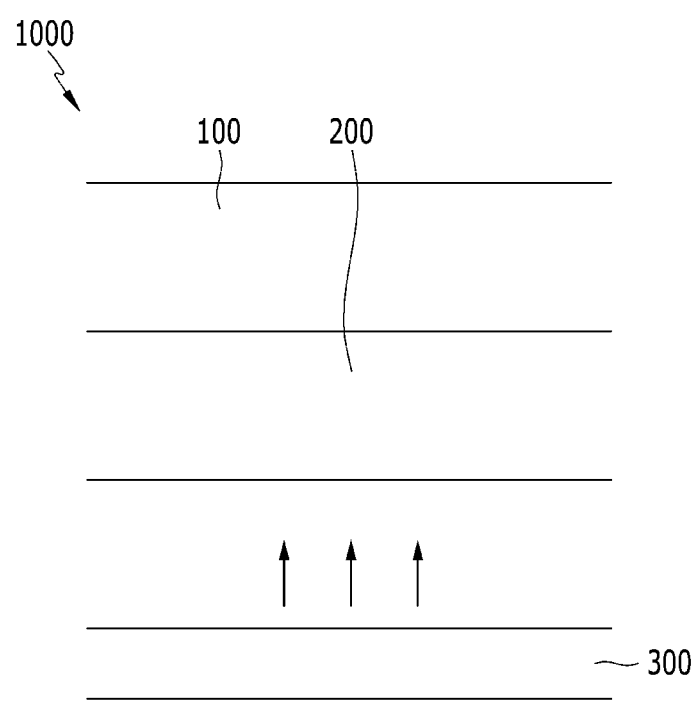
FIG. 8 illustrates a cross-sectional view of a display device according to another exemplary embodiment of the present disclosure.
Figure 9:
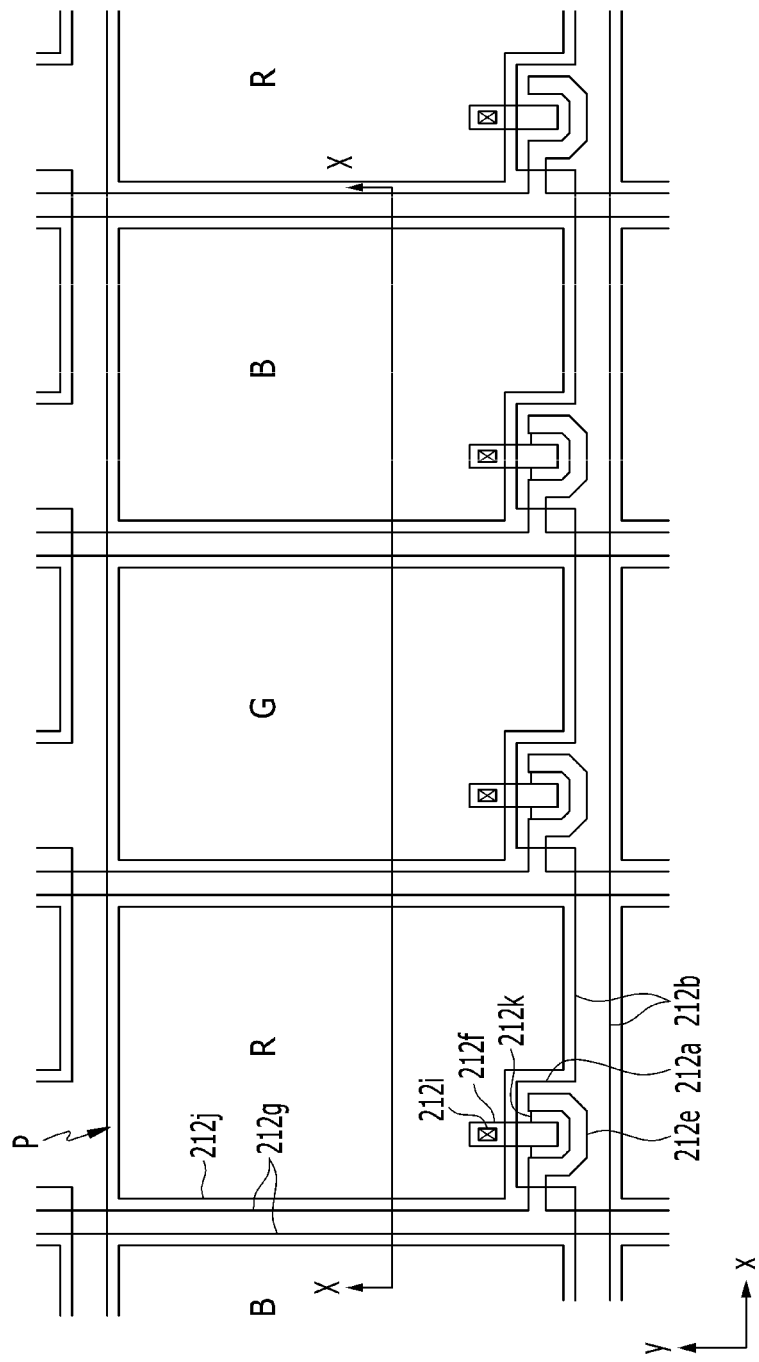
FIG. 9 illustrates a top plan view of a display device shown in FIG. 8.
Figure 10:
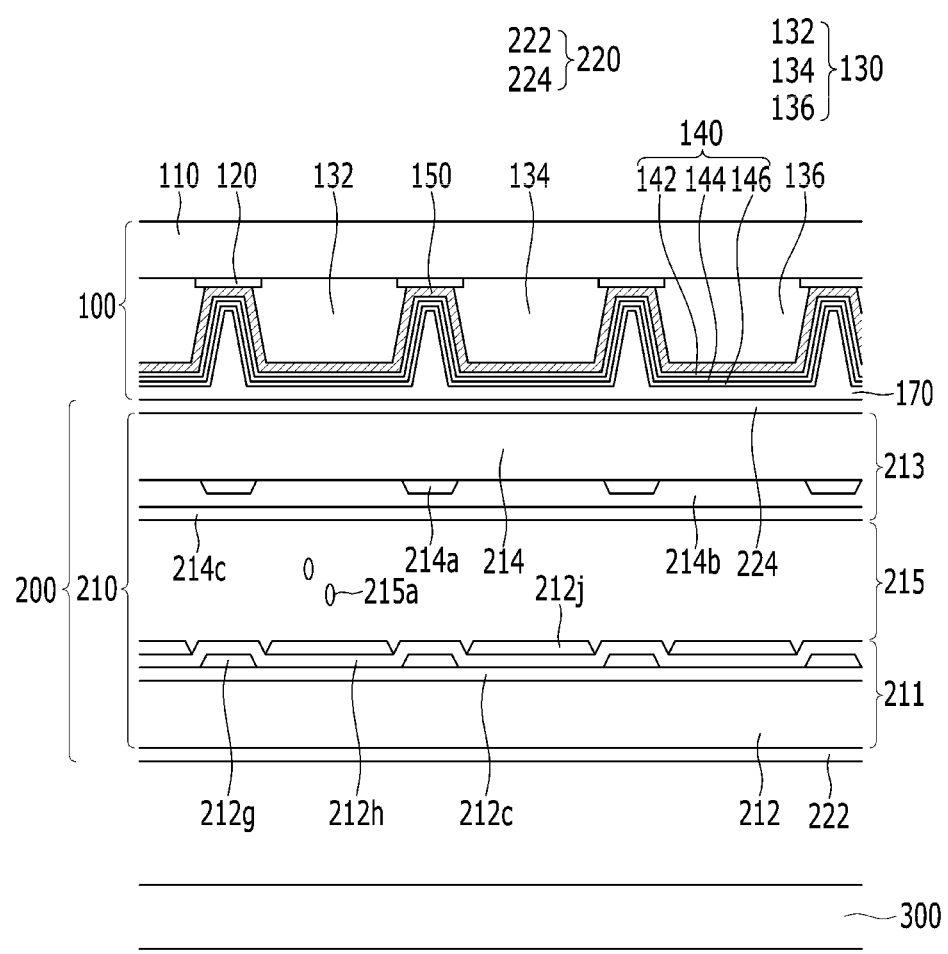
FIG. 10 illustrates a cross-sectional view taken along line X-X of FIG. 9.

FIG. 8 illustrates a cross-sectional view of a display device according to another exemplary embodiment of the present disclosure, FIG. 9 illustrates a top plan view of a display device shown in FIG. 8, and FIG. 10 illustrates a cross-sectional view taken along line X-X of FIG. 9. Constituent elements that are identical or similar to those of the above-described exemplary embodiments of the present disclosure will be omitted.

Referring to FIG. 8, the display device 1000 according to the present exemplary embodiment includes the color conversion panel 100, the display panel 200 disposed on one surface of the color conversion panel 100, and a light assembly 300 disposed on one surface of the display panel 200.

The color conversion panel 100 shown in FIG. 8 may be one of the color conversion panels 100 according to the various exemplary modified embodiments described with reference to FIG. 2 to FIG. 7, so a repeated description thereof will be omitted. The color conversion panel 100 according to the present exemplary embodiment may further include a planarization layer 170 (refer to FIG. 10) providing a flat surface for facilitating adhesion with the display panel 200.

The display panel 200 of the present exemplary embodiment includes a plurality of pixels to display an image, and may include a vertical alignment type liquid crystal panel which uses a vertical electric field, but is not limited thereto. Moreover, the display panel 200 may be a display panel such as a liquid crystal panel, a plasma display panel (PDP), an organic light emitting diode (OLED) display, a surface conduction electron-emitter display (SED), a field emission display (FED), a vacuum fluorescent display (VFD), an e-paper, or the like which use a horizontal electric field. Hereinafter, the vertical alignment type display panel will be exemplarily described in detail.

The light assembly 300 may include a light source that is disposed under the display panel 200 and emits light, and a light guide plate (not shown) that receives the light and guides the received light to the display panel 200 and the color conversion panel 100. When the display panel 200 is a self-emissive display device, the light assembly 300 may be omitted.

The light assembly 300 of the present exemplary embodiment may include at least one light emitting diode which is a blue light emitting diode as an example. The light source according to the present exemplary embodiment may be an edge type light assembly disposed on at least one lateral surface of the light guide, or a direct type light assembly in which the light source of the light assembly 300 is disposed directly under the light guide (not shown), but is not limited thereto.

Hereinafter, the display panel 200 according to the present exemplary embodiment will be described in detail with reference to FIG. 9 and FIG. 10.

Referring to FIG. 9 and FIG. 10, the display panel 200 may include a liquid crystal panel 210 for displaying an image, and polarizers 220 disposed at opposite surfaces of the liquid crystal panel 210. A first polarizer 222 and a second polarizer 224 for polarizing light incident from the light assembly 300 are disposed on the opposite surfaces of the liquid crystal panel 210.

At least one of a coating type polarizer and a wire grid polarizer may be used as the polarizer 220. The polarizer 220 may be disposed at one surface of the display device 1000 in various forms such as a film, a coating, and an attached form. However, this description is only exemplary, and the present disclosure is not limited thereto.

The liquid crystal panel 210 includes a lower panel 211 including a thin film transistor for displaying an image, an upper panel 213 including a second substrate 214 overlapping the lower panel 211, and a liquid crystal layer 215 interposed between the lower panel 211 and the upper panel 213.

A plurality of pixel electrodes 212j are disposed in a matrix form on a first substrate 212 included in the lower panel 211.

A gate line 212b extending in a row direction and including a gate electrode 212a, a gate insulating layer 212c disposed on the gate line 212b, a semiconductor layer 212k disposed on the gate insulating layer 212c, a data line 212g and a drain electrode 212f disposed on the semiconductor layer 212k and extending in a column direction and including a source electrode 212e, a passivation layer 212h disposed on the data line 212g and the drain electrode 212f, and the pixel electrode 212j physically and electrically connected to the drain electrode 212f through a contact hole 212i, are disposed on the first substrate 212.

The semiconductor layer 212k disposed on the gate electrode 212a forms a channel layer in a region that is not covered with the source electrode 212e and the drain electrode 212f, and the gate electrode 212a, the semiconductor layer 212k, the source electrode 212e, and the drain electrode 212f form one thin film transistor.

Next, the second substrate 214 overlaps the first substrate 212 while being separated therefrom. A black matrix 214a, an overcoat layer 214b, and a common electrode 214c are disposed between the second substrate 214 and the liquid crystal layer 215.

The black matrix 214a is disposed between the second substrate 214 and the liquid crystal layer 215. The overcoat layer 214b having a flat surface may be disposed between the black matrix 214a and the liquid crystal layer 215, and the common electrode 214c is disposed between the overcoat layer 214b and the liquid crystal layer 215. In some exemplary embodiments, the overcoat layer 214b may be omitted.

Although not shown, an alignment layer may be disposed between the pixel electrode 212j and the liquid crystal layer 215 and between the common electrode 214c and the liquid crystal layer 215. The common electrode 214c receiving a common voltage generates an electric field with the pixel electrode 212j to arrange liquid crystal molecules 215a in the liquid crystal layer 215.

The liquid crystal layer 215 includes the plurality of liquid crystal molecules 215a, and an arrangement direction of the liquid crystal molecules 215a is controlled by the electric field formed between the pixel electrode 212j and the common electrode 214c. An image may be displayed by controlling transmittance of light received from the light assembly 300 according to the arrangement direction of the liquid crystal molecules 215a.

In the above-described display panel 200, one thin film transistor and one pixel electrode 212j connected thereto are defined as one pixel P, and according to the present exemplary modified embodiment, one pixel P included in the display panel 200 corresponds to one of the first color conversion layer 132 and the second color conversion layer 134 included in the color conversion layer 130 of the color conversion panel 100. In other words, as shown in FIG. 10, the conversion layer 130 and the transmissive layer 136 may be formed to have an island shape.

That is, the first color conversion layer 132 and the second color conversion layer 134 according to the present exemplary embodiment are not formed on the substrate 110 to have a stripe shape across a plurality of pixels P, but are present as island shapes of a unit of a pixel so as to overlap one pixel P included in the display panel 200. According to the first color conversion layer 132 and the second color conversion layer 134 having this structure, it is possible to reduce a possibility that hydrogen gas is congregated when the optical filter layer 140 is formed through a subsequent deposition process.

The color conversion panel 100 according to the exemplary embodiment of the present disclosure and the display device 1000 including the same has been described above. According to the present exemplary embodiments, it is possible to prevent the hydrogen gas congregated in the manufacturing process of the color conversion panel 100 from being diffused into the display panel 200 of the display device 1000 during subsequent high temperature processes and to cause defects of the products.

Although the specific exemplary embodiments have been described and illustrated above, the present disclosure is not limited to the exemplary embodiments described herein, and it would be apparent to those skilled in the art that various changes and modifications might be made to these embodiments without departing from the spirit and the scope of the inventive concept. Therefore, the changed examples and modified examples should not be individually understood from the technical spirit or the viewpoint of the present disclosure, and it should be appreciated that modified exemplary embodiments will be included in the appended claims of the present disclosure.

What is claimed is:

1. A color conversion panel comprising:
a substrate;
a plurality of light blocking layers disposed on the substrate;
a color conversion layer disposed on the substrate and comprising two color conversion members, each of the two color conversion members being partially disposed between two light blocking layers of the plurality of light blocking layers and including quantum dots;
an optical filter layer covering the color conversion layer and the light blocking layers;
a capping layer disposed between the optical filter layer and the color conversion layer; and
a hydrogen blocking layer disposed on the optical filter layer, made of a transparent conductive material, having a curved structure and covering the color conversion layer and the plurality of light blocking layers, wherein the optical filter layer, the capping layer, and the hydrogen blocking layer are partially disposed inside a gap between the two color conversion members.

2. The color conversion panel of claim 1, wherein a portion of the hydrogen blocking layer is disposed inside the gap between the two color conversion members and overlaps one of the light blocking layers.

3. The color conversion panel of claim 1, wherein the hydrogen blocking layer is disposed between the optical filter layer and the color conversion layer.

4. The color conversion panel of claim 1, wherein the hydrogen blocking layer is disposed on one surface of the optical filter layer corresponding to an opposite side of the color conversion layer.

5. The color conversion panel of claim 1, wherein the optical filter layer includes a plurality of layers in which inorganic layers having different refractive indexes are alternately stacked.

6. The color conversion panel of claim 5, wherein the optical filter layer includes: a first inorganic material layer including a silicon nitride; and a second inorganic material layer including a silicon oxide, wherein the first inorganic material layer contacts the color conversion layer and the light blocking layers.

7. The color conversion panel of claim 1, wherein the hydrogen blocking layer is disposed between the capping layer and the color conversion layer.

8. The color conversion panel of claim 1, wherein the hydrogen blocking layer is disposed between the capping layer and the optical filter layer.

9. The color conversion panel of claim 1, wherein the capping layer includes an inorganic material containing nitrogen.

10. A display device comprising:
a display panel including a plurality of pixel electrodes and a common electrode, wherein the common electrode overlaps the plurality of pixel electrodes; and
a color conversion panel disposed at the display panel, wherein the color conversion panel includes:
a substrate;
a plurality of light blocking layers disposed on the substrate;
at least one color conversion layer disposed on the substrate, overlapping at least one pixel electrode of the plurality of the pixel electrodes, and including quantum dots;
at least one transmissive layer disposed on the substrate and overlapping another pixel electrode of the plurality of the pixel electrodes;
an optical filter layer covering the color conversion layer and the light blocking layer;
a capping layer disposed between the optical filter layer and the color conversion layer; and
a blocking layer electrically insulated from the common electrode, disposed on the at least one transmissive layer and the at least one color conversion layer, made of a transparent conductive material, and having a curved structure, wherein the optical filter layer, the capping layer, and the blocking layer are partially disposed inside a gap between the at least one transmissive layer and the at least one color conversion layer.

11. The display device of claim 10, wherein the plurality of light blocking layers includes a light blocking layer, wherein the light blocking layer is disposed on a face of the substrate, and wherein a face of the curved structure of the blocking layer is parallel to the face of the substrate, is parallel to a face of the light blocking layer, and is disposed inside the gap between the at least one transmissive layer and the at least one color conversion layer.

12. The display device of claim 10, wherein the capping layer is disposed between the blocking layer and the optical filter layer.

13. The display device of claim 10, wherein the capping layer is disposed between the blocking layer and the color conversion layer.

* * * * *